United States Patent [19]
Condon

[11] Patent Number: 5,329,971
[45] Date of Patent: Jul. 19, 1994

[54] CLOSET FLANGE TEST PLUG

[76] Inventor: Duane R. Condon, 2330 Raymond Ave., Ramona, Calif. 92065

[21] Appl. No.: 129,690

[22] Filed: Sep. 30, 1993

Related U.S. Application Data

[63] Continuation-in-part of Ser. No. 926,032, Aug. 4, 1992, abandoned.

[51] Int. Cl.⁵ ............................................. F16L 55/10
[52] U.S. Cl. .................................... 138/89; 220/314; 220/293; 292/256.6
[58] Field of Search ............. 138/89, 90; 24/24, 458, 24/487, 497, 272; 220/241, 233, 300, 314, 293, 327; 292/256.6, 256.67, 256; 4/295, 293, 286, 252.1, 252.6, 252.5

[56] References Cited

U.S. PATENT DOCUMENTS

| | | | |
|---|---|---|---|
| 986,297 | 3/1911 | Kinkade | 138/90 |
| 1,174,055 | 3/1916 | Carlson | 138/90 |
| 1,689,643 | 10/1928 | Rudolph | 292/256 |
| 2,078,003 | 4/1937 | Klein | 138/89 |
| 2,477,663 | 8/1949 | Sexton | 138/90 |
| 2,559,210 | 7/1951 | Bradley | 138/90 |
| 2,743,034 | 4/1956 | Wheatley | 138/89 |
| 3,618,811 | 11/1971 | Martine | 138/89 |
| 3,747,541 | 7/1973 | Reese | 138/89 |
| 3,858,612 | 1/1975 | Van Steenburg | 138/89 |
| 4,233,697 | 11/1980 | Cornwall | 138/89 |
| 5,208,937 | 5/1993 | Cooper | 138/89 |

FOREIGN PATENT DOCUMENTS 0055059 10/1920 Sweden ................................ 138/90

Primary Examiner—Timothy F. Simone
Assistant Examiner—James F. Hook
Attorney, Agent, or Firm—Baker, Maxham, Jester & Meador

[57] ABSTRACT

An apparatus for sealing the central opening in a conventional closet flange extending perpendicular to a drain pipe. A generally disk-shaped sealing member is connected to the lower end of a threaded shaft screwed through an intermediate hub in a diametrically extending mounting body. A pair of L-shaped retaining arms are pivotally connected to corresponding ends of the mounting body. Heads on the lower ends of the retaining arms may be inserted through diametrically spaced key-shaped slots in the closet flange and engaged with the underside of the flange. A handle connected to the upper end of the shaft may be turned to screw the shaft downwardly. This firmly presses an elastomeric boot on a convex underside of the sealing member against an inner edge of the central opening in the closet flange. This seals the opening in the closet flange to permit pressure testing of the drain and its associates sewer system.

9 Claims, 4 Drawing Sheets

CLOSET FLANGE TEST PLUG

CROSS-REFERENCE TO RELATED APPLICATION

This is a continuation-in-part of my prior U.S. patent application Ser. No. 07/926,032 filed Aug. 4, 1992 having the same title now abandoned.

BACKGROUND OF THE INVENTION

The present invention relates to tools used by plumbers in residential and commercial building construction, and more particularly, to a device which may be readily mounted over the closet flange of a drain pipe normally used to support a toilet bowl flange in order to seal the pipe for pressure testing.

The use of mounting or closet flanges for toilet bowls on drain or discharge sewer pipes in both residential and both commercial construction is well known. See for example U.S. Pat. Nos. 3,181,585; 3,339,215; and 4,090,267. For many years, the closet flange and drain pipe were manufactured as one integral unit made of cast iron. More recently, so-called "drain/waste/vent" (DWV) pipe made of ABS (Trademark) plastic has been extensively utilized. A standard plastic DWV vent pipe is available with an integral closet flange.

The typical closet flange includes two opposed semicircular slots on the flat receiving surface of the flange, which allow for insertion and then tightening of bolts perpendicular to the surface. Some closet flanges are also provided with diametrically opposed outwardly opening slots in the flange for receiving bolts. This was the typical configuration of the earlier cast-iron closet flanges.

A continual problem which has been faced by plumbers is the proper installation and mounting of drain pipe early in construction, long before the toilet bowl is mounted in place. Some plumbers cover the closet flange opening with duct tape, paper, burlap or anything handy which is easily dislodgable. As a result, debris from construction frequently goes through the opening in the closet flange and into the drain pipe, causing plugging. Since the closet flange is on the floor of the building, debris almost always accumulates in the pipe. The flange openings and the face of the closet flange can become encrusted with tile grout. Cleaning is time consuming and expensive and the closet flange can be broken or damaged.

U.S. Pat. No. 3,846,851 describes a closet flange which incorporates an integral knockout plug. However, there is a chance that the flange can be damaged in the removal of the plug. Also, the knockout plug can fall down into the drain pipe causing plugging. The flange is still subject to damage before the toilet bowl is mounted thereon.

Another problem continually faced by plumbers relates to pressure testing of the sewer system in a building. Most municipalities have a plumbing code, such as the Uniform Plumbing Code (UPC), which requires that the sewer pipe system in a residence or commercial building be capable of withstanding a predetermined internal pressure, between about five pounds per square inch and fifteen pounds per square inch, without any apparent leaks. In order to accomplish such a pressure test, it is necessary for each drain pipe terminating in a closet flange to be sealed. Standards set by the International Association of Plumbing and Manufacturing Offices (IAPMO) prohibit internal threading of the drain pipe portion adjacent the closet flange. Therefore, it is not possible to seal the hole in the closet flange with an externally threaded plug.

There have been several approaches for sealing a closet flange in order to accomplish a pressure test, but each of these approaches is expensive and, in some cases, time consuming. One approach is to insert an elastomeric ball into the drain pipe and to inflate the same to accomplish a seal. These inflatable plugs are expensive and the inflation thereof is both time consuming and dangerous. Over-inflation can lead to explosions, which can injure the plumber. An inflatable seal only seals the inside of the pipe, and does not test the joint between the pipe and the closet flange. An alternate approach is to glue a seal into the hole in the closet flange leading to the drain pipe. However, once the pressure test is complete, this seal must be broken out, and frequently lodges in the drain pipe, causing plugging. Furthermore, the knocking out of a plug which has been glued into place can damage the closet flange.

Another approach to pressure testing of a drain pipe connected to a closet flange is to manufacture a closet flange with an integral breakout seal as indicated above. However, these seals often become lodged in the drain pipe when they are broken out. Therefore, many municipalities are considering banning closet flanges with breakout seals. Yet another approach to sealing the hole in the closet flange is to utilize a so-called "dollar plug". This plug has a large wing nut which is turned by the plumber in order to expand an elastomeric sleeve against the internal walls of the drain pipe adjacent the closet flange. These dollar plugs frequently fail to provide an effective seal, and they are time consuming to install and remove. Also, repeated use of dollar plugs is sometimes impaired because they rust and become encrusted with grout and other debris. The dollar plug frequently does not allow the seal between the pipe and the closet flange to be tested.

U.S. Pat. No. 4,233,697 of Cornwall discloses a protective cover or cap 10 for toilet mounting flange 14 which is installed on a drain pipe 21. The cover 10 is comprised of a disk-shaped plate 11 with tubes 12 that extend upwardly from plate 11 which has a lower surface 11a to mate with the flat toilet bowl surface 13a. A flat elastomeric disk-shaped ring seal 15 is provided to seat between surfaces 11a and 13a and can be either separate or attached to the flange 14 or the cover 11. The bolts 18 which are ultimately used to attach the toilet bowl to the mounting flange 14 are protected in the tubes 12. Cornwall's device is designed to hydrostatically test the toilet bowl mounting flanges to determine if there are any leaks in the flange or in the drain pipe. The preferred embodiment in shown in FIGS. 2 and 3, which discloses the cover 100 having two tubes 118 with rectangular cross-section holes 119. The problem with Cornwall's device is that it is very difficult to attain a true seal when securing a flat disk with only two bolts. Tightening of the two bolts tends to cause the center of the disk to bulge, leaving gaps for leaks.

U.S. Pat. No. 2,559,210 of Bradley discloses a device, including a U-shaped strap 14 for holding a closet flange ring 10 firmly in place over the upper end of the drain pipe 11 during the pouring of concrete 12 around the drain pipe. Bolt and nut assemblies 22 and 23 extend through elongated slots 19 and 20 in the ring 10 and attach to opposite sides of the U-shaped strap 14. A generally cylindrical elastomeric member 32 may be radially expanded against the inner walls of the drain pipe 11 by rotating a wing nut 27 mounted above the center of the U-shaped strap 14. A threaded pipe 31 extends through a slotted portion in the center segment of the U-shaped strap 14 and through the center of the elastomeric member 32. The elastomeric member 32 is squeezed radially against the inner wall of the pipe 11 by turning the wing nut 27 in order to squeeze the elastomeric member 32 between bearing members 28 and 35. When the elastomeric member 32 is squeezed against the inner wall of the pipe 11, the device forms a test plug. The U-shaped strap 14 is not an anchor for the test plug, but rather is held in place by the test plug. The device Bradley is thus very similar to the conventional dollar plug described above. It is difficult and time consuming to install. Significant torque or tightening on wing nut 27 is required. This device may be difficult to repeatedly use because of the build up of debris on the threaded pipe, and because the mechanical components of this device may rust over a long period of time.

SUMMARY OF THE INVENTION

It is therefore the primary object of the present invention to provide an improved closet flange test plug that may be readily installed and which will protect the closet flange from damage which providing an air-tight seal to allow the sewer system to be tested.

The present invention provides an apparatus for sealing the central opening in a closet flange extending perpendicular to a drain pipe connected to the flange. The apparatus includes a generally disk-shaped sealing member, which is connected to the lower end of a threaded shaft. The shaft is screwed through a horizontally extending mounting body intermediate the length thereof. A pair of retaining arms are each connected to a corresponding end of the mounting body. The retaining arms are dimensioned to fit in corresponding diametrically spaced slots in the closet flange so that heads at the lower ends of the retaining arms can engage an underside of the flange. A handle or knob on the upper end of the shaft may be turned to rotate the shaft and firmly press a lower convex surface of the sealing member against an entire inner edge of the closet flange to seal the central opening therein.

The disk-shaped sealing member preferably includes an elastomeric boot which covers the underside of a mandrel forming the other part of the sealing member. The boot is formed with a centering ridge or ring and is preferably made of a material with a maximum Shore A hardness of 60.

My closet flange test plug is adaptable to a wide range of sizes and configurations of closet flanges, including three inch and four inch size, cast iron, ABS, copper and PVC types, and both hub and spigot configurations. The sealing pressure is centrally located or exerted to create an equal and uniform sealing force around the edge of the closet flange.

DETAILED DESCRIPTION OF THE PREFERRED EMBODIMENTS

Figure 1:
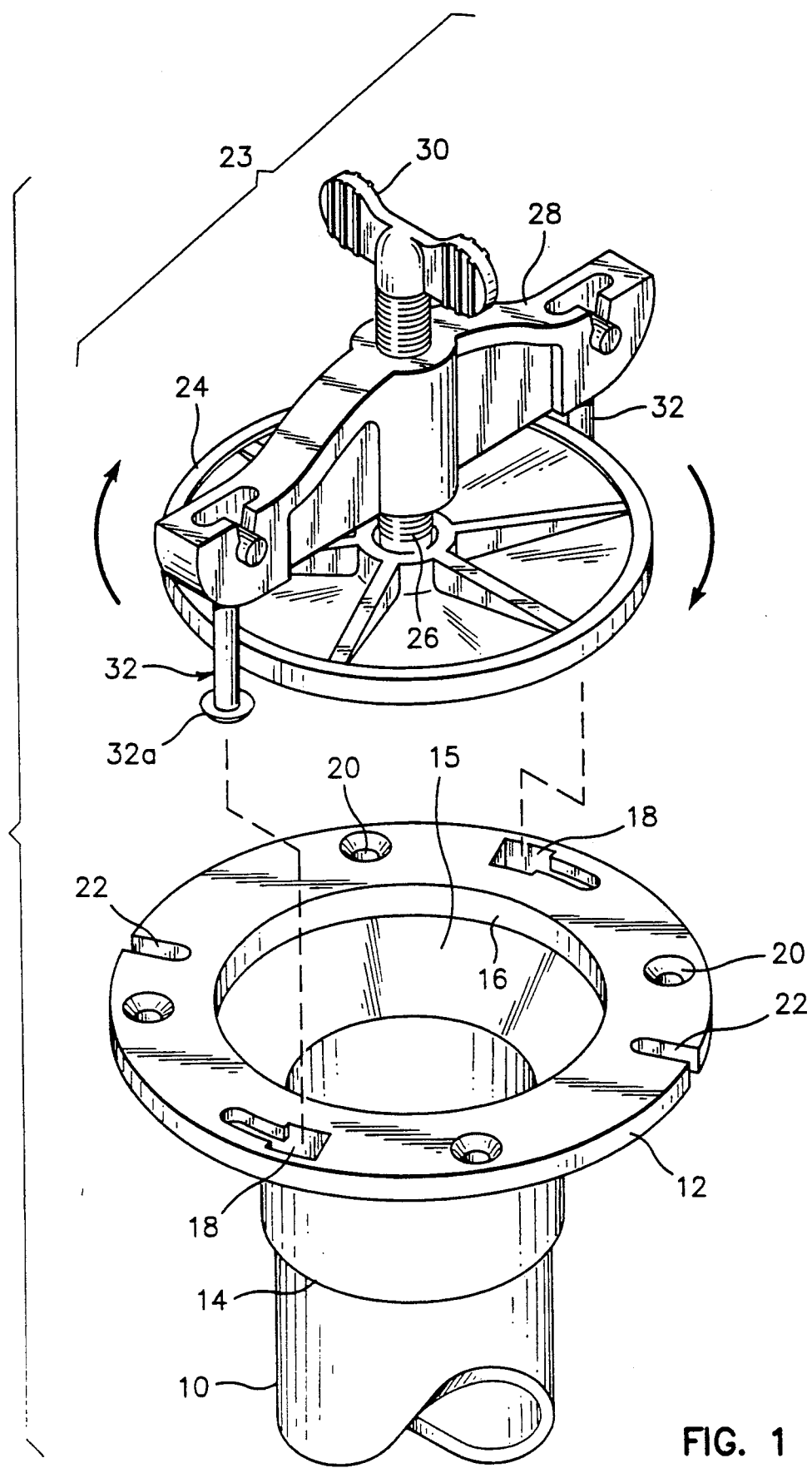
FIG. 1 is a perspective view illustrating the mounting relationship between a preferred embodiment of my apparatus and a conventional closet flange mounted on a drain pipe.

Referring to FIG. 1, a conventional upstanding ABS drain pipe 10 is shown with a conventional closet flange 12 connected to the upper end of the same. The closet flange 12 extends generally perpendicular to the pipe 10. The closet flange 12 may be integrally formed with a cylindrical sleeve or collar 14 which fits over the upper end of the drain pipe 10. The closet flange 12 and sleeve 14 may be injection molded of ABS plastic and may be adhesively bonded to the upper end of the drain pipe 10. The closet flange 12 has a large central opening 15 defined by a circular inner edge 16. The closet flange 12 is formed with a pair of diametrically spaced key-shaped slots 18. The closet flange 12 also has four smaller holes 20 formed therein and spaced apart by ninety degrees. The holes 20 are normally used to receive bolts which permanently attach the mating flange of the toilet bowl (not illustrated) to the closet flange 12. Cast iron closet flanges typically have outwardly opening radial slots 22 formed in the flange and which are diametrically spaced apart.

Referring still to FIG. 1, the preferred embodiment of my apparatus 23 comprises a generally disk-shaped sealing member 24 which is attached to the lower end of a threaded shaft 26. The threaded shaft 26 is screwed through a threaded bore in a horizontally extending elongate mounting body 28. A handle 30 is connected to the upper end of the threaded shaft 26. The handle 30 is used to rotate the shaft 26 to vertically displace the disk-shaped sealing member 24 relative to the mounting body 28. A pair of retaining arms 32 are connected to and extend downwardly from opposite ends of the mounting body 28. The retaining arms have enlarged generally hemispherical heads 32a on the lower ends thereof. These heads may be inserted through the enlarged portions of the key-shaped slots 18 in the closet flange 12 as indicated by the phantom lines in FIG. 1, the apparatus 23 may then be slightly rotated clockwise as indicated by the arrows in FIG. 1 to engage the heads 32a with the underside of flange 12. The handle 30 may then be turned to rotate the shaft 26 and firmly press a lower convex surface of the sealing member 24 against the inner edge 16 of the closet flange 12. This seals the central opening 15 in the closet flange and allows pressure testing of the sewer system connected to the drain pipe 10.

Figure 2:
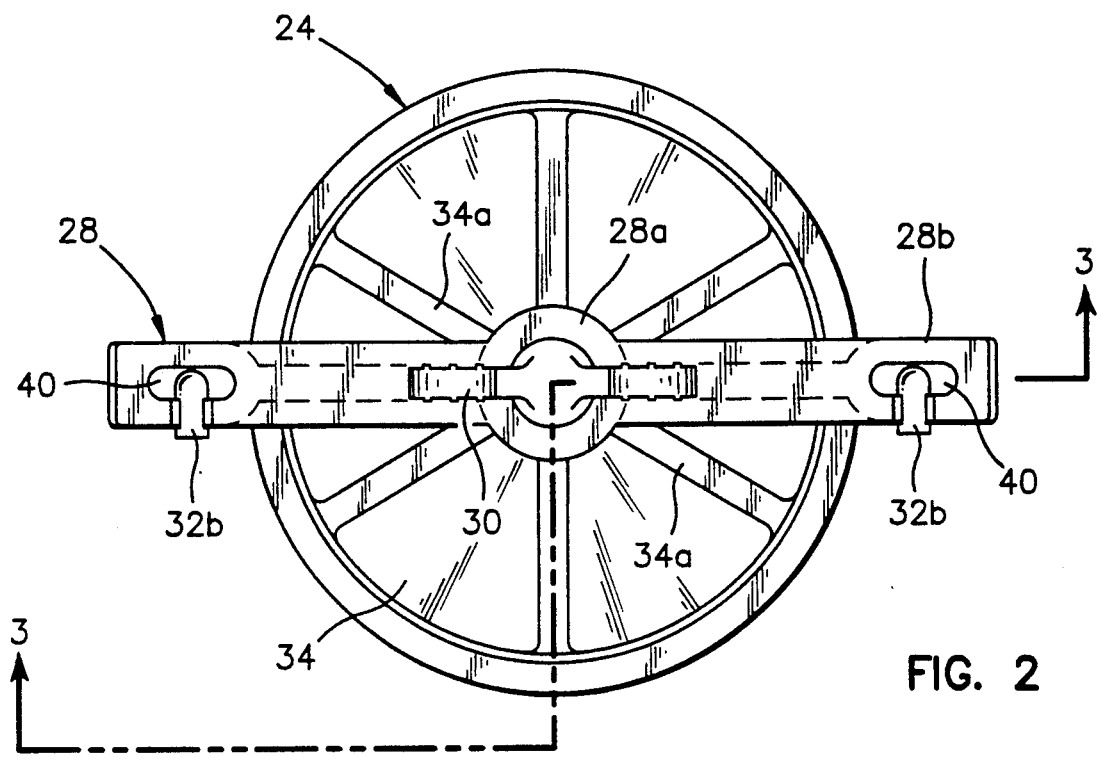
FIG. 2 is a top plan view of the preferred embodiment of my apparatus.
Figure 3:
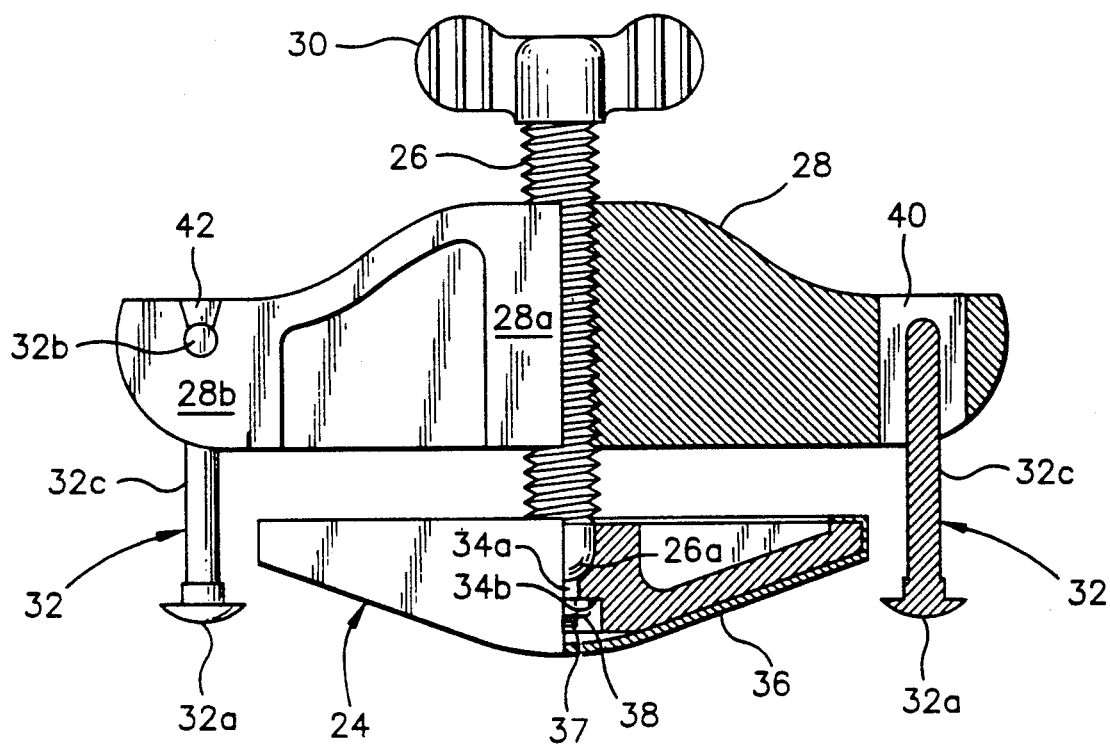
FIG. 3 is a part side elevation, part vertical sectional view of the preferred embodiment of my apparatus taken along line 3—3 of FIG. 2.
Figure 4:
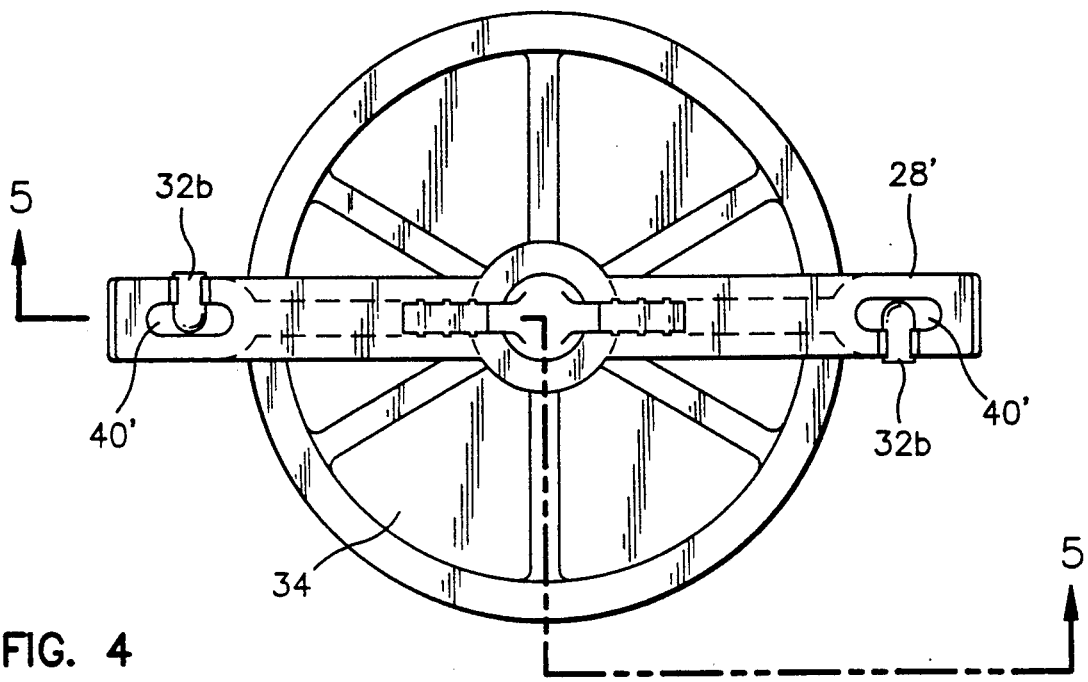
FIG. 4 is a top plan view of an alternate embodiment of my apparatus.

Details of the construction of the preferred embodiment of my apparatus 23 are shown in FIGS. 2 and 3. The disk-shaped sealing member 24 includes an inner mandrel 34 preferably injection molded of suitable rigid plastic such as that sold under the trademark DELRIN. The underside of the mandrel 34 has a rounded convex shape. In order to conserve on both the cost of the plastic and the weight of the sealing member 24, the mandrel 34 is preferably injection molded with a plurality of radially extending ribs 34a (FIG. 2). The disk-shaped sealing member 24 further includes an elastomeric covering or boot 36 (FIG. 3) which covers the convex underside of the mandrel 34. This boot 36 may be made of thermoplastic material having the appropriate durometer on the Shore A scale. The boot 36 may be adhesively bounded to the convex underside of the mandrel 34. The preferred method of fabrication is to mold the boot to the correct size and shape and slip fit it over the mandrel. The function of the boot 36 is to engage the upper portions of the inner edge 16 (FIG. 1) of the closet flange 12 to insure an air-tight seal between the sealing member 24 and the closet flange. Thus the boot 36 is preferably compressed and deformed against the inner edge 16 to provide the greatest degree of sealing.

The threaded shaft 26 may be injection molded of plastic or may be made of metal. The lower end 26a of the shaft is preferably rounded or hemispherical. The mandrel 34 is formed with a complementary shaped hole for receiving the rounded lower end 26a of the shaft 26. A metal bolt 37 extends through the center of the threaded shaft 26. A nut 38 is screwed over the threaded lower end of the bolt 37 and tightens against a shoulder 34b of the mandrel.

The mounting body 28 comprises a unitary injection molded plastic body aligned arms extending in opposite directions having an intermediate cylindrical hub portion 28a through which the threaded bore for shaft 26 extends. The enlarged end portions 28b of the mounting body 28 are formed with vertical through-holes or receiving slots 40. The retaining arms 32 are L-shaped with a pivot pin or arm formed at an upper end. The smaller horizontal leg 32b of each arm 32 can be pushed upwardly through a corresponding slot 40, twisted ninety degrees and then snapped into a corresponding key-shaped recess or mounting slot 42 formed in the enlarged end portion 28b of the mounting body 28. This reduces the cost of manufacture and assembly of my test plug. The lower leg 32c of each retaining arm 32 is free to pivot in its corresponding recess 40. This facilitates insertion of the heads 32a through the slots 18 in the closet flange 12 so that the heads engage the underside of the flange.

The handle 30 may be injection molded of plastic and screwed over the threaded upper end of the shaft 26. Alternatively, the handle 30 and shaft 26 may be integrally molded around metal bolt 36. Alternatively, the shaft 26, handle 30 and bolt 36 may all be integrally molded of plastic.

FIGS. 4-7 illustrate an alternate embodiment of my test plug which provides an even more effective seal on larger diameter pipes. It is generally similar in construction to the preferred embodiment of my test plug illustrated in FIGS. 1-3. Therefore, similar reference numerals in FIGS. 4-7 denote parts which are the same as those of the preferred embodiment. My alternate embodiment differs in several key respects. My alternate embodiment has a modified mounting body 28' which is formed with modified receiving slots 40'. These slots are configured so that the horizontal legs 32b (FIG. 4) of the L-shaped retaining arms 32 extend in opposite directions. This has been found to prevent the mounting body 28' from being twisted out of vertical alignment upon tightening of the handle 30. The key-shaped recesses or mounting slots 42' (FIG. 7) open on opposite sides of the mounting body 28'. The key-shaped recesses 42' (FIG. 7) are formed with intermediate projections or keepers 43 on opposite sides thereof past which the horizontal legs 32b of the retaining arms must be snapped into place.

Figure 5:
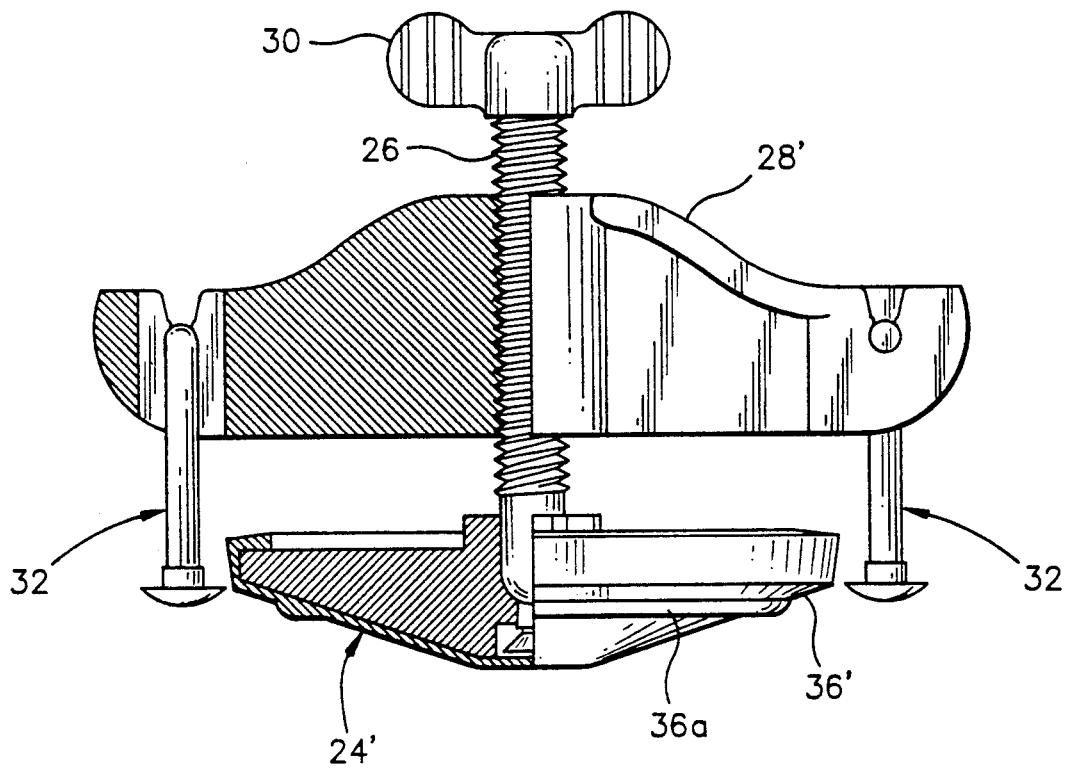
FIG. 5 is a part side elevation, part vertical section of the alternate embodiment of my apparatus taken along line 5—5 of FIG. 4.
Figure 6:
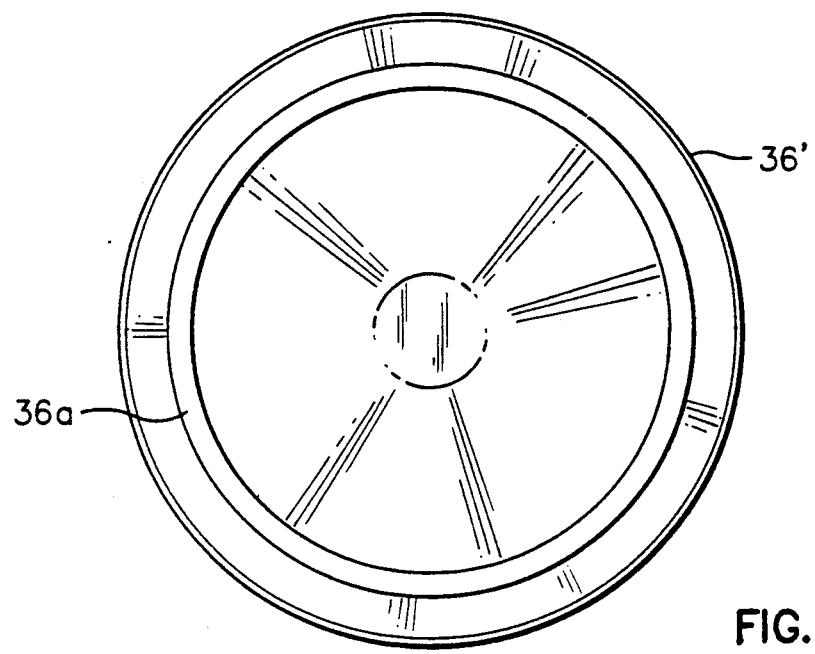
FIG. 6 is a bottom plan view of the disk-shaped sealing member of the alternate embodiment illustrating details of its elastomeric boot.
Figure 7:
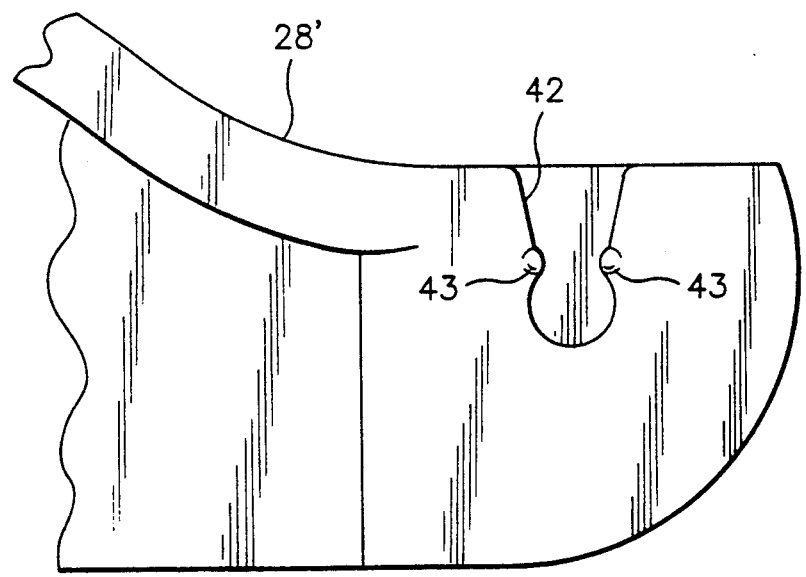
FIG. 7 is an enlarged fragmentary view of one of the end portions of the mounting body of the alternate embodiment illustrating details of its retaining arm mounting slot.

The disk-shaped sealing member 24' has a modified elastomeric covering or boot 36' (FIGS. 5 and 6). An approved seal can be obtained if the boot 36' is sufficiently deformable, i.e., its material does not exceed a Shore A hardness of 60. By molding a raised centering ridge or ring 36a (FIGS. 5 and 6) having an outer diameter slightly less that that of the circular inner edge 16 (FIG. 1) of the central opening 15 in the closet flange 12, the sealing member 24' will stay centered over the closet flange during installation, thereby insuring an effective seal. However, this feature only provides an advantage where the outer diameter of the ring 36a is slightly less than the diameter of the opening in a single known size of closet flange.

While I have described a preferred embodiment of my test plug, it will be apparent to those skilled in the art that the preferred embodiment may be modified in both arrangement and detail without departing from the spirit of my invention. For example, the shape of the mounting body and retaining arms can be varied. They could be formed as one integral unit. The handle could be replaced with a knob. The convex lower surface of the sealing member could be provided by a disk with a conical or frusto-conical underside instead of a rounded underside. The entire disk-shaped sealing member could be made of a semi-rigid elastomeric material. Therefore, the protection afforded my invention should only be limited in accordance with the scope of the following claims.

I claim:

1. An apparatus for temporarily sealing the central opening in a closet flange of the type having diametrically opposite mounting slots, comprising:

an elongate unitary mounting body having a first arm with a first end and a second arm with a second end, the arms aligned in opposite directions from a central hub having a threaded through base, each end having an arm receiving slot and an upwardly opening pin mounting slot therein;

a generally circular disk-shaped sealing member having an elastomeric generally convex lower surface dimensioned for covering an opening in the closet flange and sealingly engaging an entire inner edge of the closet flange surrounding the opening;

an elongated threaded shaft mounted in the threaded through bore;

manually grippable means mounted to an upper end of the shaft for rotating the shaft;

means for connecting a lower end of the shaft to a center of the disk-shaped sealing member so that the shaft extends perpendicular away from an upper surface of the sealing member; and a pair of unitary generally L-shaped retaining arms each disposed in a receiving slot and having an integral formed outwardly extending pivot pin on one end extending into a mounting slot and thereby connected to a corresponding end of the mounting body and having a head on another end, the head of each of said retaining arms being dimensioned to fit in corresponding diametrically spaced slots in the closet flange so that the heads can be engaged with an underside of the flange so that the manually grippable means may be turned to rotate the shaft and firmly press the lower surface of the sealing member against the inner edge of the closet flange to seal the central opening in the closet flange.

2. An apparatus according to claim 1 wherein the lower surface of the sealing member is formed by an elastomeric cover.

3. An apparatus according to claim 1 wherein the retaining arms are each pivotally connected in a respective mounting slot to the corresponding end of the mounting body.

4. An apparatus according to claim 3 wherein the mounting body comprises a unitary injection molded plastic body having said central hub through which the threaded bore extends.

5. An apparatus according to claim 1 wherein the sealing member comprises an injection molded plastic mandrel and an elastomeric boot covering said convex lower surface thereof.

6. An apparatus according to claim 5 wherein the lower end of the shaft is hemispherical and means for connecting the lower end of the shaft to the sealing member comprises a nut and bolt assembly.

7. An apparatus according to claim 6 wherein the heads of the retaining arms are generally hemispherical.

8. An apparatus according to claim 7 wherein each of the mounting slots is a key-shaped mounting slot with an upwardly opening V-shaped portion which opens on opposite sides of the mounting body for each receiving the outwardly extending pin of a corresponding one of the retaining arms.

9. An apparatus for sealing the central opening in a standard closet flange having diametrically spaced key-shaped attachment slots and adapted to be mounted substantially flush with a floor, comprising:

an elongate unitary mounting body having a central hub with threaded bore extending therethrough and a pair of rigid arms extending outward in opposite directions from said central portion, each of said arms having a vertical receiving slot therethrough and an upwardly opening key-shaped mounting slot in a side of each of said vertical slots said mounting slots being on opposite sides of said mounting body;

an elongated threaded shaft having an upper end and a lower end, said shaft being threadably mounted in the threaded bore of the mounting body;

a manually operable hand grip on said upper end of said shaft for manual rotation thereof;

a generally circular disk-shaped sealing member having an upper surface and and elastomeric generally convex lower surface dimensioned for covering an opening in the closet flange and sealingly engaging an entire inner edge of the closet flange surrounding the opening and a coaxially disposed mounting bore in said upper surface of said sealing member for receiving said lower end of said threaded shaft and rotatably mounting said sealing member thereon so that the shaft extends generally perpendicular away from an upper surface of the sealing member; and a pair of elongated generally L-shaped retaining arms each disposed in a corresponding receiving slot and having an outward extending short pin formed at an upper end extending into a corresponding key-shaped mounting slot for pivotally mounting the respective retaining arm in a corresponding receiving slot, each retaining arm having an elongated body terminating in a lower end having a generally hemispherical head, each of said hemispherical heads being dimensioned to fit in corresponding diametrically spaced key-shaped attachment slot in the closet flange so that the heads can be engaged with an underside of the flange, so that the manually grippable means may be turned to rotate the shaft and firmly press the lower surface of the sealing member against the inner edge of the closet flange for sealing the central opening in the closet flange.

* * * * *